(12) United States Patent
Oka

(10) Patent No.: US 6,342,882 B1
(45) Date of Patent: Jan. 29, 2002

(54) IMAGE PROCESSING APPARATUS AND METHOD AND TRANSMISSION MEDIUM

(75) Inventor: Masaaki Oka, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/160,989

(22) Filed: Sep. 25, 1998

(30) Foreign Application Priority Data

Sep. 26, 1997 (JP) .............................................. 9-279827

(51) Int. Cl.[7] .............................................. G06T 15/00
(52) U.S. Cl. ........................ 345/419; 345/422; 345/426; 345/589; 345/592
(58) Field of Search ................................ 345/419–426, 345/431, 589, 592

(56) References Cited

U.S. PATENT DOCUMENTS

| | | | | |
|---|---|---|---|---|
| 5,638,499 A | * | 6/1997 | O'Connor et al. .......... 395/131 |
| 5,706,481 A | * | 1/1998 | Hannah et al. .............. 395/519 |
| 5,854,631 A | * | 12/1998 | Akeley et al. ............... 345/419 |
| 5,870,097 A | * | 2/1999 | Snyder et al. ............... 345/426 |
| 5,880,735 A | * | 3/1999 | Shinohara .................... 345/419 |
| 5,917,496 A | * | 6/1999 | Fujita et al. ................. 345/422 |
| 5,920,687 A | * | 7/1999 | Winner et al. .............. 395/122 |
| 5,923,333 A | * | 7/1999 | Stroyan ....................... 345/422 |
| 5,977,987 A | * | 11/1999 | Duluk, Jr. .................... 345/441 |
| 6,016,151 A | * | 1/2000 | Lin ............................. 345/430 |

* cited by examiner

*Primary Examiner*—Mark Zimmerman
*Assistant Examiner*—Enrique L Santiago
(74) *Attorney, Agent, or Firm*—Lerner, David, Littenberg, Krumholz & Mentlik, LLP

(57) ABSTRACT

A CPU selects a rendering mode to be employed when an alpha test condition is not satisfied from a plurality of rendering modes in accordance with a user's selection and sets the selected mode. An alpha test circuit compares the value of alpha data of an image with a constant, and judges whether a comparison result satisfies the condition. If it is judged that the comparison result does not satisfy the condition, the alpha test circuit causes a rendering process to be executed in accordance with the rendering mode thus set.

14 Claims, 15 Drawing Sheets

IMAGE PROCESSING APPARATUS AND METHOD AND TRANSMISSION MEDIUM

BACKGROUND OF THE INVENTION

The present invention relates to an image processing apparatus and method and a transmission medium, and, more specifically, to an image processing apparatus and method and a transmission medium in which one of a plurality of rendering modes is selected and set and a rendering process is executed in accordance with the rendering mode thus set.

In such image processing apparatus as a computer gate machine, an image is prescribed by a combination of a plurality of polygonal regions and the entire object is rendered on a polygon-by-polygon basis. Such image processing apparatuses can display, on a monitor, polygons in a virtual space while changing their states in various manners.

FIG. 1 is a block diagram showing an example configuration of an image processing apparatus of the above kind. In this example, the CPU 11 performs various operations such as a coordinate conversion, a light source calculation, and a vector operation as well as controls the respective sections. A main bus 12 that transfers data at relatively high speed and a sub-bus 13 that transfers data at relatively low speed are connected to the CPU 11. The CPU 11 can exchange data via the buses 12 and 13. A CD-ROM drive 14, which is connected to the sub-bus 13, can read out any of various data or programs from a CD-ROM as a recording medium that is mounted therein in accordance with an instruction that is sent from the CPU 11.

A main memory 15 and a GPU (graphic processing unit) 16 are connected to the main bus 12. The main memory 15 stores data that has been read out from the CD-ROM drive 14, data as an operation result of the CPU 11, and other data. The GPU 16 performs a rendering operation while reading out data from the main memory 15 when necessary, and stores processed image data in a VRAM (video random access memory) 17. Further, the GPU 16 reads out image data from the VRAM 17 and supplies it to a D/A converter 18. The D/A converter 18 converts image data (digital signal) that is supplied from the GPU 16 into an analog signal and outputs it to a monitor (not shown) as a video signal.

In rendering a blended image by superimposing two images on each other in the above image processing apparatus, if one of the two images has a translucent region, such as a polygonal region, pixel data of the two images are blended together by using alpha data that are added to the image data (color data) of the respective subject images. The alpha data is a coefficient that takes a value in a range of 0.0 to 1.0. A value 1.0 is added to an opaque polygon, and a value 0.0 is added to a transparent polygon. A value in a range of 0.0 to 1.0 is added to a translucent polygon (the degree of transparency increases as the value becomes closer to 0.0, and decreases as the value becomes closer to 1.0).

For example, when a translucent image G is superimposed on an opaque image F, blended pixel data Cb is given by $$Cb = As \cdot Cs + (1-As)Cd \quad (1)$$

where a notation is employed that Cd and Ad are pixel data and alpha data of the image F and Cs and As are pixel data and alpha data of the image G.

This type of process is called alpha blending.

FIG. 2 is a block diagram showing a more detailed example configuration of the GPU 16 and the VRAM 17 as circuits for performing alpha blending. In this example, the GPU 16 is composed of an interpolation circuit 21 and an alpha blending circuit 22 and the VRAM 17 has a Z buffer 31 and a frame buffer 32.

The interpolation circuit 21 performs interpolation on a polygon that has been read out from the main memory 15 (see FIG. 1), and supplies pixel data Cs of the interpolated polygon to the alpha blending circuit 22 and supplies depth data Zs and alpha data As of the interpolated polygon to the VRAM 17. The alpha blending circuit 22 generates pixel data Cb by blending pixel data Cd of a polygon that is stored in the VRAM 17 and the pixel data Cs that is supplied from the interpolation circuit 21 by using the alpha data that is supplied from the interpolation circuit 21. The alpha blending circuit 22 outputs the generated image data Cb to the VRAM 17.

The Z buffer 31 stores one of depth data Zs that is supplied from the interpolation circuit 21 of the GPU 16, the one depth data Zs having a larger value (indicating that the image is located closer to the viewer's side). The frame buffer 32 stores image data of an image to be displayed on the monitor. The VRAM 17 stores alpha data As that is supplied from the interpolation circuit 21 in a predetermined area.

FIG. 3 illustrates an example process of rendering a blended image by superimposing two images on each other by using the alpha blending circuit shown in FIG. 2. In this example, it is assumed that pixel data Cd and alpha data Ad of an image 110 are stored in the VRAM 17 in advance and that an image 120 is to be superimposed on the image 110. In FIG. 3, pixel data of polygons that define each image are shown on the left side and corresponding alpha data values are shown on the right side.

In this example, a polygonal region 112 of the image 110 is opaque and the value of the corresponding alpha data Ad is 1.0. A region 122 of the image 120 is translucent and the value of its alpha data As is 0.5. A region 111 of the image 110 and a region 121 of the image 120 are transparent, and the values of their alpha data Ad and As are 0.0.

The alpha blending circuit 22 generates pixel data Cb by blending the pixel data Cd and Cs of the images 110 and 120 by using the alpha data As of the image 120 (refer to Equation (1)). The generated pixel data Cb and the alpha data As are rendered in (written to) the VRAM 17 as an image 130. The alpha data of the rendered image is newly denoted by Ad. The value of the pixel data Cb of the image 130 is the same as that of the pixel data Cd of the image 110 in regions 131 and 132, and is equal to (0.5 Cs+0.5 Cd) in a region 133.

In this case, although blending is correctly done for the pixel data Cb, the alpha data Ab is rendered as being the same as the alpha data As of the image 120. Since the opaque region 112 and the translucent region 122 have been superimposed on each other, the value of the alpha data Ab corresponding to the regions 132 and 133 should be 1.0 indicating that those regions are opaque. Therefore, in this case, the rendering operation has not been performed correctly.

Incidentally, a method called an alpha test may be used in an image drawing process of the above kind. FIG. 4 is a block diagram showing an example configuration of the GPU 16 and the VRAM 17 in which a circuit for performing an alpha test is provided. The components in FIG. 4 that have corresponding components in FIG. 2 are given the same reference numerals as in FIG. 2 and descriptions therefor will be omitted where appropriate. In this example, an alpha test circuit 23 is provided between the interpolation circuit 21 and the VRAM 17. A predetermined constant C is set in the alpha test circuit 23. The alpha test circuit 23 compares the value of alpha data As that is supplied from the interpolation circuit 21 with the value of the constant C, and judges whether a comparison result satisfies a predetermined condition. In accordance with a judgment result, the alpha test circuit 23 makes a selection as to whether to render blended pixel data Cb that has been generated by the alpha blending circuit 22 and the alpha data As in the VRAM 17.

FIG. 5 illustrates an example process of rendering a blended image in which the value of the constant C of the alpha test circuit 23 shown in FIG. 4 is set at 1.0 and the condition is set to "EQUAL." The parts in FIG. 5 that have corresponding parts in FIG. 3 are given the same reference symbols as in FIG. 3 and descriptions therefor will be omitted where appropriate. In this example, the alpha test circuit 23 compares the values of alpha data As of an image 120 with the value of the constant C, and judges whether they are equal to each other. In this case, since alpha data As corresponding to regions 121 and 122 of an image 120 have values 0.0 and 0.5, there is no alpha data As whose value is equal to the value 1.0 of the constant C. Therefore, comparison results do not satisfy the condition EQUAL (1.0), and the alpha test circuit 23 gives a write disable instruction WD to the VRAM 17 so that blended pixel data Cb that has been generated by the alpha blending circuit 23 and the alpha data As are not rendered in the VRAM 17. As a result, a blended image 140 is the same as the image 110. That is, in this case, the blended image rendering operation has not been performed correctly.

FIG. 6 illustrates an example process of rendering a blended image in which the value of the constant C of the alpha test circuit 23 shown in FIG. 4 is set at 0.0 and the condition is set to "NOT-EQUAL." The parts in FIG. 6 that have corresponding parts in FIG. 3 are given the same reference symbols as in FIG. 3 and descriptions therefor will be omitted where appropriate. The alpha test circuit 23 compares the values of alpha data As of an image 120 with the value of the constant C. Since the value of the alpha data As corresponding to a region 122 satisfies the condition NOT-EQUAL, the alpha test circuit 23 gives a write enable instruction WE to the VRAM 17, whereby blended pixel data Cb that has been generated by the alpha blending circuit 22 and the value 0.5 of the alpha data As are rendered in the VRAM 17 as an image 150.

Since regions 152 and 153 of the rendered image 150 have been generated by superimposing an opaque region 112 of an image 110 and the translucent region 122 of the image 120, alpha data Ab corresponding to the regions 152 and 153 should have a value 1.0 indicating that those regions are opaque. However, in this case, a value 0.5 indicating that the region 153 is translucent is rendered. Therefore, the rendering operation has not been performed correctly.

Next, with reference to FIG. 7, a description will be made of an example of an image rendering process in which image depth is taken into consideration. This is a process called a Z buffer method in which values of depth data are compared with each other on a pixel-by-pixel basis based on depth data that is added to respective pixels and, when a plurality of pixels are to be superimposed one on another, only a pixel that is closest to the viewer's side is rendered and the other pixels behind that pixel are not rendered. In FIG. 7, pixel data of each image are shown on the left side, corresponding alpha data values are shown at the center, and a depth data value is shown on the right side. Pixels exist closer to the viewer's side in the virtual space as the depth data value increases, and exist at a deeper position as it becomes closer to 0.

In this example, alpha data Ad of regions 161 and 162 of an image 160 have respective values 1.0 (opaque) and 0.5 (translucent), and alpha data As of regions 171 and 172 of an image 170 have a value 1.0 (opaque). Depth data Zd and Zs of the images 160 and 170 have respective values 100.0 and 50.0, which means that the image 160 is closer to the viewer's side than the image 170.

First, the respective data of the image 160 is rendered in the VRAM 17. Then, the pixel data of the image 170 is blended with that of the image 160. However, a comparison between the value of the depth data Zd of the image 160 that is stored in the Z buffer 31 and the depth data Zs of the image 170 shows that the depth data Zs of the image 170 is smaller than the depth data Zd of the image 160 and hence the image 170 is deeper than the image 160. As a result, the respective data of the image 170 is prohibited from being rendered in the VRAM 17. Therefore, in this case, an image 180 as a blended result remains the image 160 though correctly it should be such that the image 170 is seen through the translucent region 162 of the image 160. That is, the image rendering operation has not been performed correctly.

Next, with reference to FIG. 8, a description will be made of an example process in which an opaque polygonal region of an image is rendered as a transparent object. In this example, it is assumed that an image 400 is stored in the VRAM 17 in advance. Both of alpha data Ad and depth data Zd of the image 400 have a value 0.0. Depth data Zs corresponding to pixel data Cs of regions 311 and 312 of an image 310-A has respective values 100.0 and 0.0, and alpha data As of the regions 311 and 312 has respective values 1.0 (opaque) and 0.0 (transparent). An assumption is made that it is desired that the opaque region 311 be used as a transparent object. Alpha data As and depth data Zs of an image 320 have values 1.0 and 50.0, respectively.

In this case, it is assumed that neither an alpha blending process nor an alpha test process is executed. First, the pixel data Cs, the alpha data As, and the depth data Zs of the image 310-A are rendered in the VRAM 17, whereby an image 310-B is obtained. Then, the pixel data Cs, the alpha data As, and the depth data Zs of the image 320 are rendered on those of the already rendered image 310-B. There is an exception that since the value 100.0 of the depth data Zd corresponding to the region 311 of the image 310-B that is stored in the Z buffer 31 is larger than the value 50.0 of the depth data Zs of the image 320, rendering of the image 320 is prohibited in the region 311. Alpha data Ab of a region 501 of a thus-blended image 500 has a value 1.0 (opaque) and hence the region 501 is not expressed as a transparent object. In order to make the region 501 transparent, it is necessary to make the alpha data corresponding to the region 311 of the image 310-A have a value 0.0, that is, to make the region 311 transparent.

Conventional image processing apparatuses, in which processes of rendering an image including a translucent portion are executed in the above manners, have a problem that pixel data and alpha data of a blended image are not correlated with each other correctly.

Where a rendering process is executed according to the Z buffer method in such a manner that two images, one of which is closer to the viewer's side than the other, are superimposed on each other, there may occur, depending on the order of rending the images in the VRAM 17, a case that an image including a translucent portion cannot be rendered.

When it is desired to use an opaque polygon as a transparent polygon, the value of corresponding alpha data needs to be converted into a value 0.0 indicating that the polygon is transparent. This causes a problem that the same data cannot be used successively.

SUMMARY OF THE INVENTION

The present invention has been made in view of the above circumstances, and an object of the present invention is therefore to make it possible to perform an image rendering operation correctly by using an alpha test.

According to a first aspect of the invention, there is provided an image processing apparatus comprising means for selecting one of a plurality of image rendering modes; means for judging whether additional information of pixel data of a region that defines an image satisfies a predetermined condition; means for rendering the pixel data and the additional information if the judging means judges that the additional information satisfies the condition; and means for executing a rendering process in accordance with the selected rendering mode if the judging means judges that the additional information does not satisfy the condition.

According to a second aspect of the invention, there is provided an image processing method comprising the steps of selecting one of a plurality of image rendering modes; judging whether additional information of pixel data of a region that defines an image satisfies a predetermined condition; rendering the pixel data and the additional information if the judging step judges that the additional information satisfies the condition; and executing a rendering process in accordance with the selected rendering mode if the judging step judges that the additional information does not satisfy the condition.

According to a third aspect of the invention, there is provided a transmission medium for transmission of a program comprising the steps of selecting one of a plurality of image rendering modes; judging whether additional information of pixel data of a region that defines an image satisfies a predetermined condition; rendering the pixel data and the additional information if the judging step judges that the additional information satisfies the condition; and executing a rendering process in accordance with the selected rendering mode if the judging step judges that the additional information does not satisfy the condition.

In the above image processing apparatus and method and the transmission medium according to the respective aspects of the invention, one of a plurality of image rendering modes is selected, the pixel data and the additional information are rendered if it is judged that the additional information satisfies the condition, and a rendering process is executed in accordance with the selected rendering mode if it is judged that the additional information does not satisfy the condition.

DETAILED DESCRIPTION OF THE PREFERRED EMBODIMENTS

Before describing an embodiments of the present invention, to clarify a correlation between the respective means of the invention recited in the claims and the components of the embodiments, the features of the invention will be described below in such a manner that the respective means are followed by, in parentheses, the corresponding components (just examples) of the embodiments. It goes without saying that the following description is not intended to limit the respective means to the associated components.

An image processing apparatus according to the first aspect comprises means (for example, step S11 shown in FIG. 11) for selecting one of a plurality of image rendering modes; means (for example, the alpha test circuit 51 shown in FIG. 9) for judging whether additional information of pixel data of a polygon that defines an image satisfies a predetermined condition; means (for example, the alpha test circuit 51 shown in FIG. 9) for rendering the pixel data and the additional information if the judging means judges that the additional information satisfies the condition; and means (for example, the alpha test circuit 51 shown in FIG. 9) for executing a rendering process in accordance with the selected rendering mode if the judging means judges that the additional information does not satisfy the condition.

Figure 1:
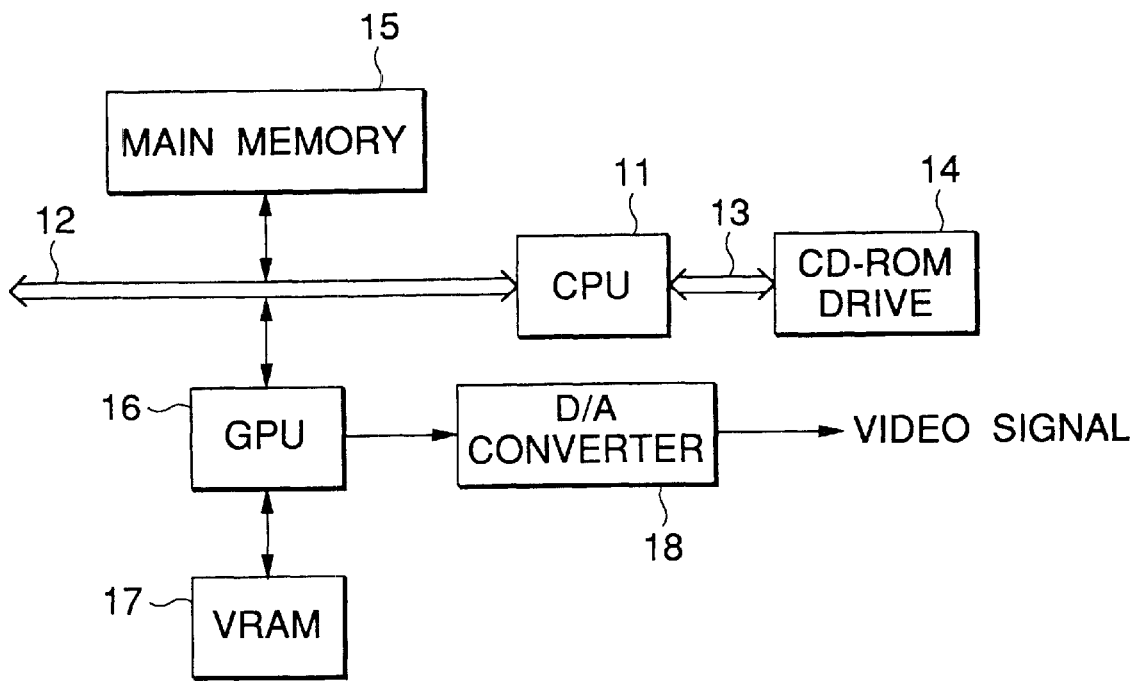
FIG. 1 is a block diagram showing an example configuration of a conventional image processing apparatus.
Figure 2:
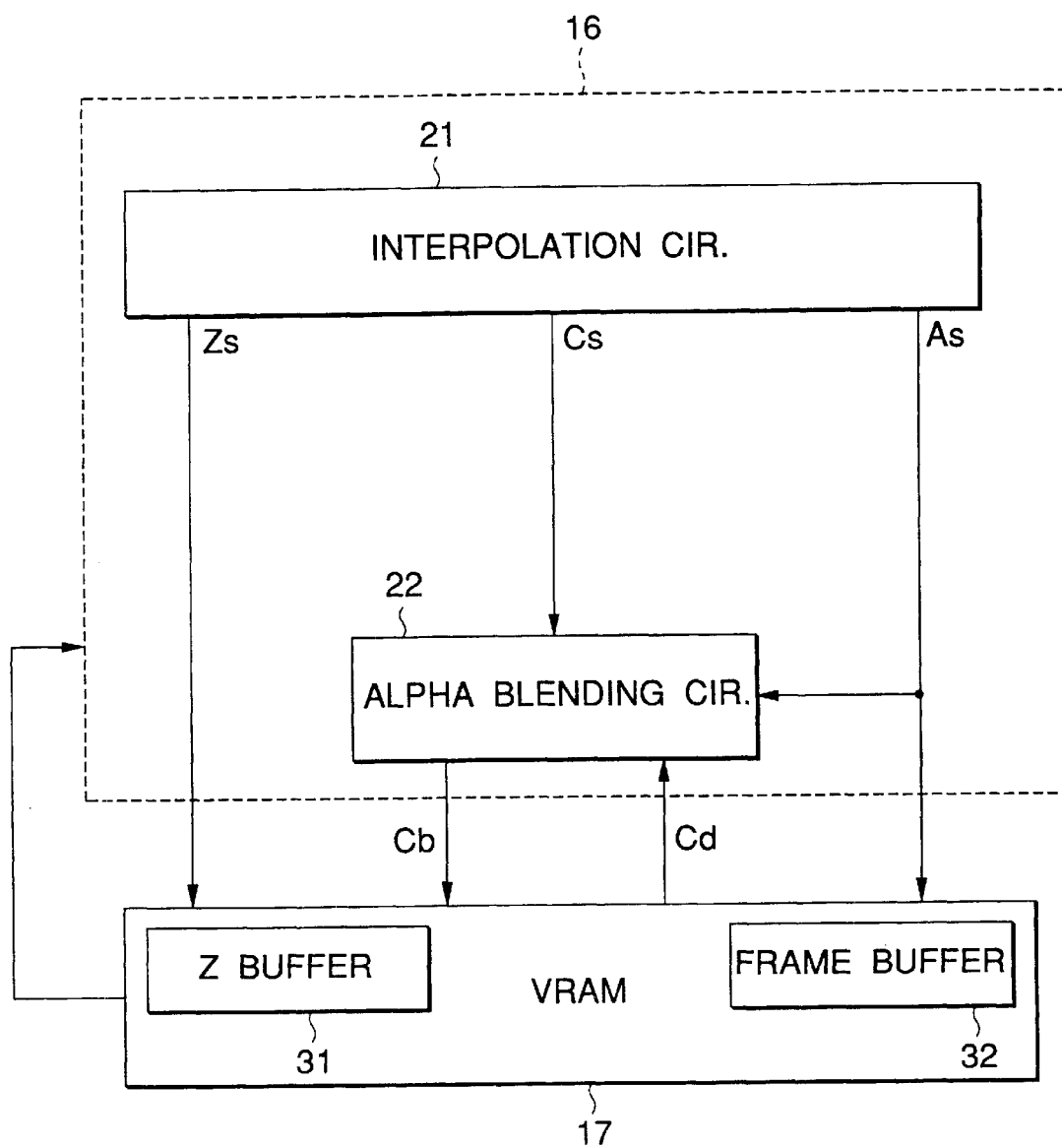
FIG. 2 is a block diagram showing a more detailed example configuration of a GPU and a VRAM shown in FIG. 1.
Figure 3:
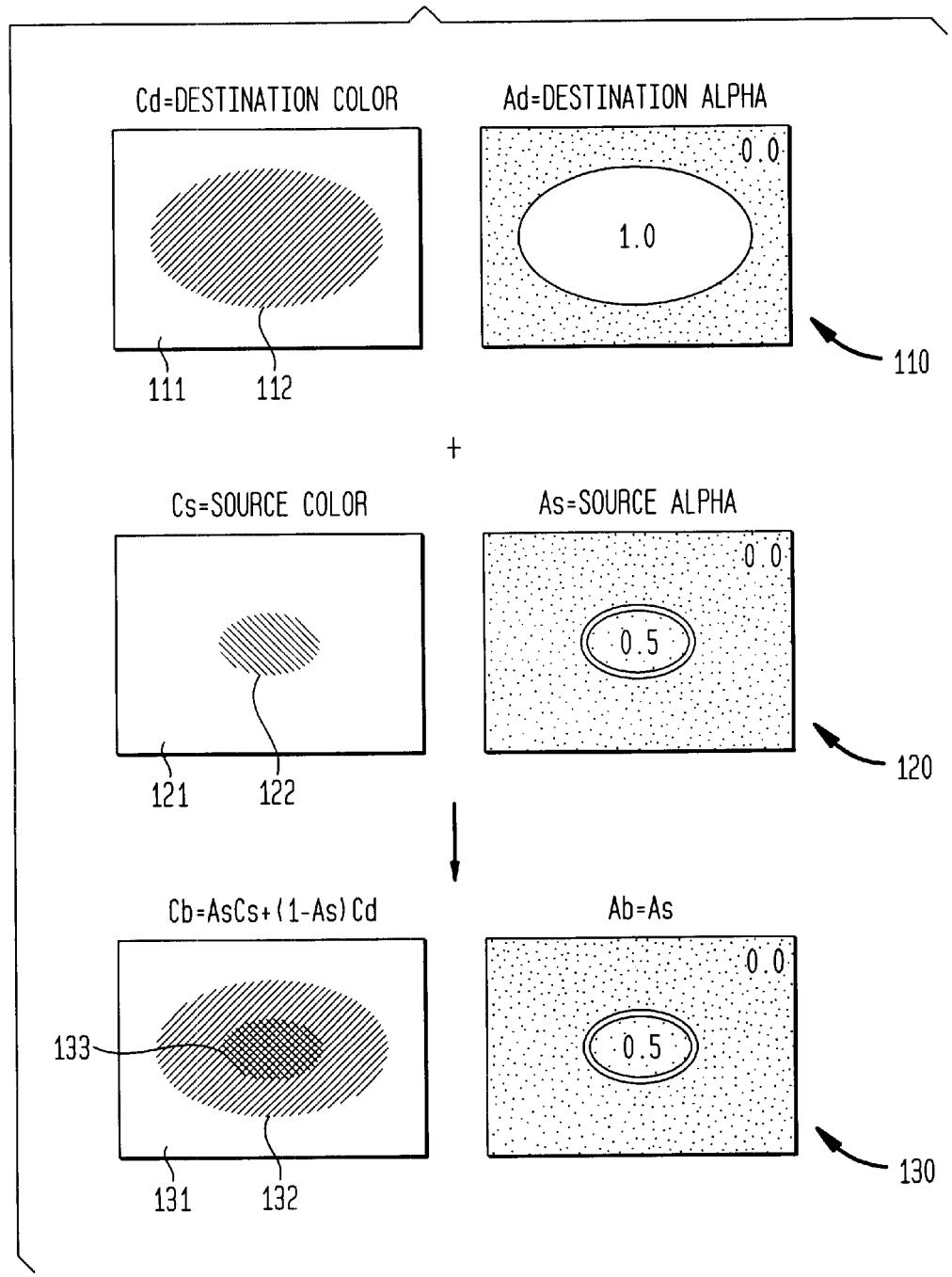
FIG. 3 illustrates an example process of rendering a blended image by superimposing two images on each other.
Figure 4:
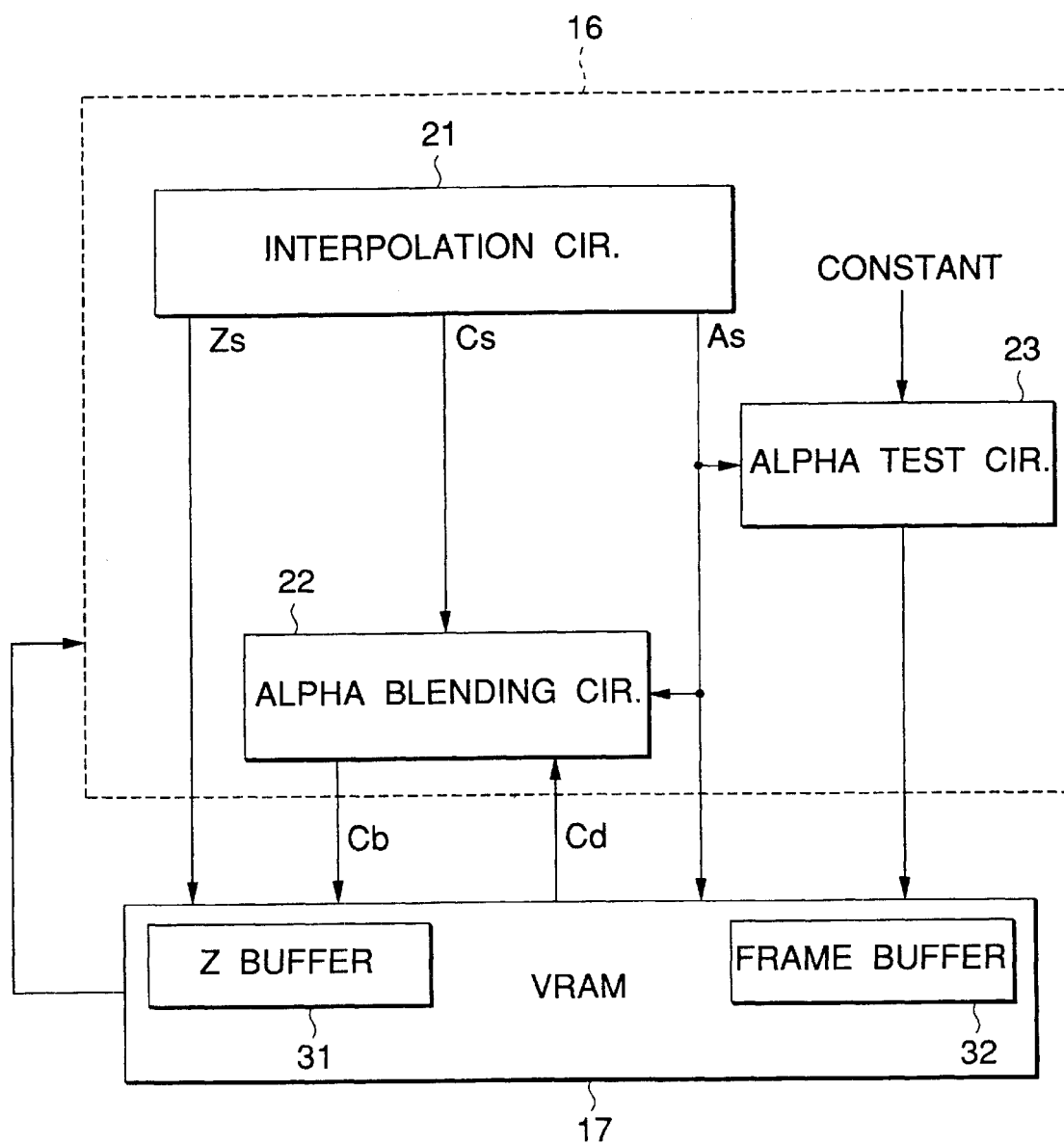
FIG. 4 is a block diagram showing an example configuration of the GPU and the VRAM shown in FIG. 1 in which an alpha test circuit is provided.
Figure 5:
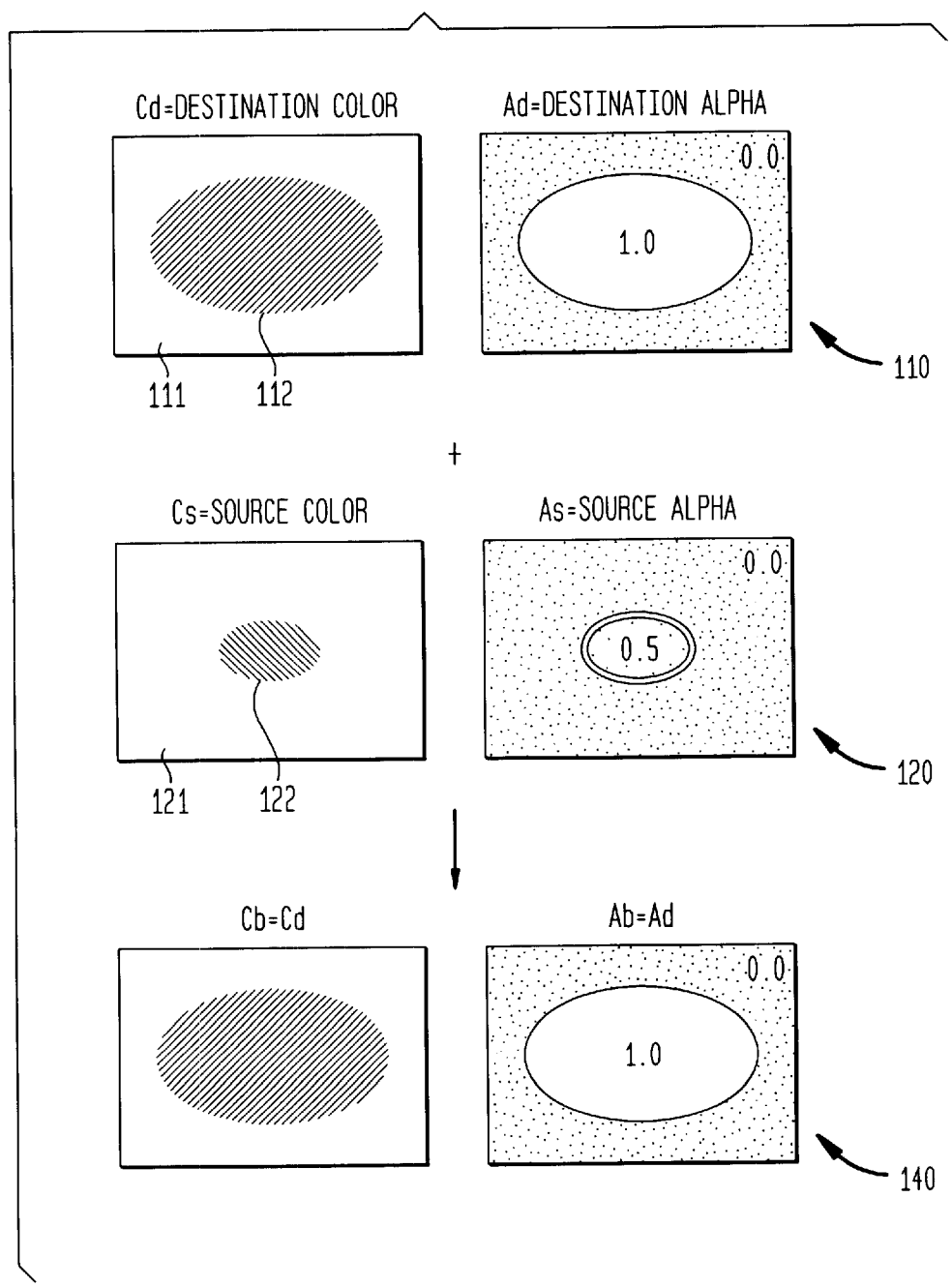
FIG. 5 illustrates an example process of rendering a blended image by superimposing two images on each other.
Figure 6:
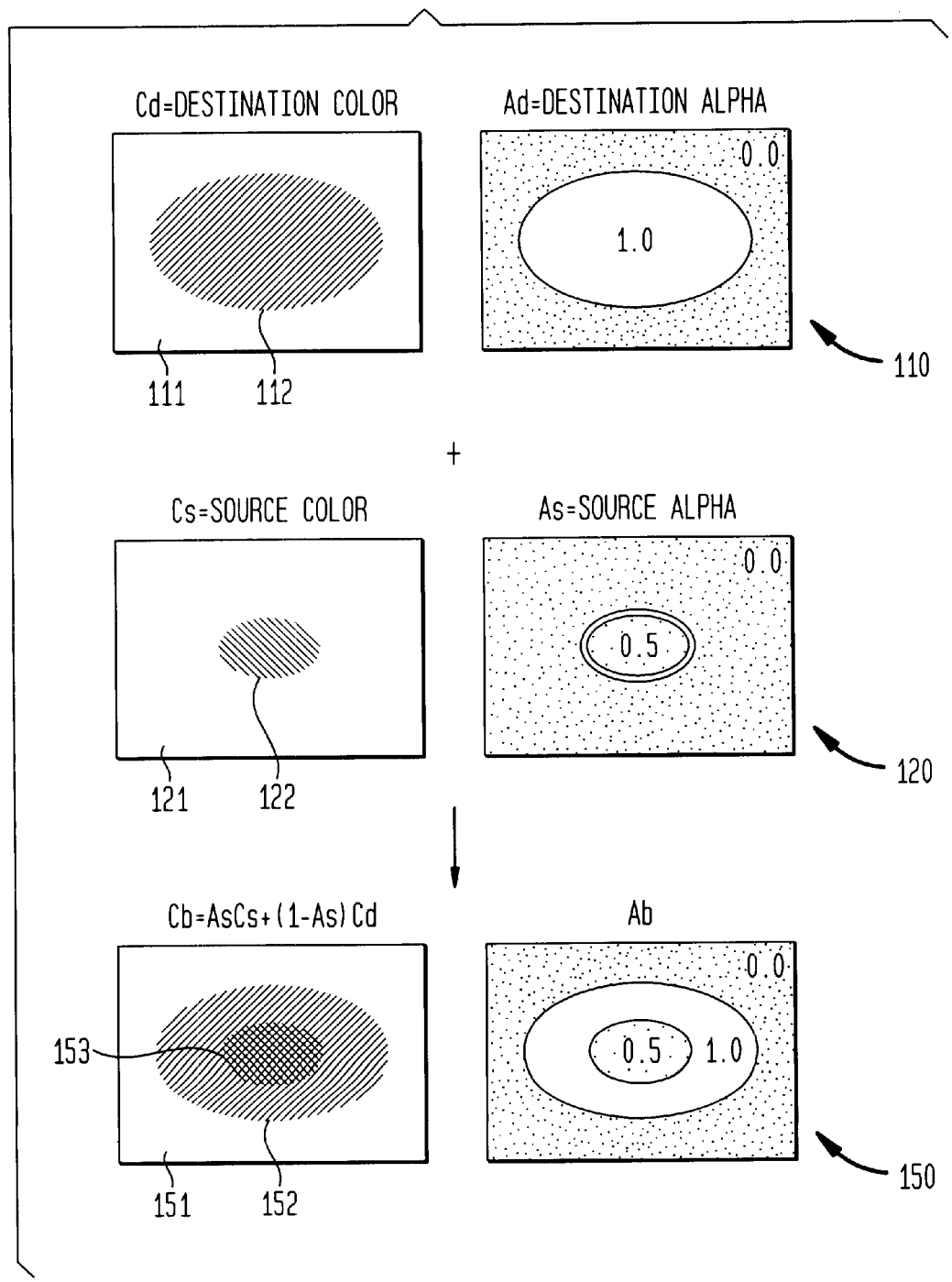
FIG. 6 illustrates another example process of rendering a blended image by superimposing two images on each other.
Figure 7:
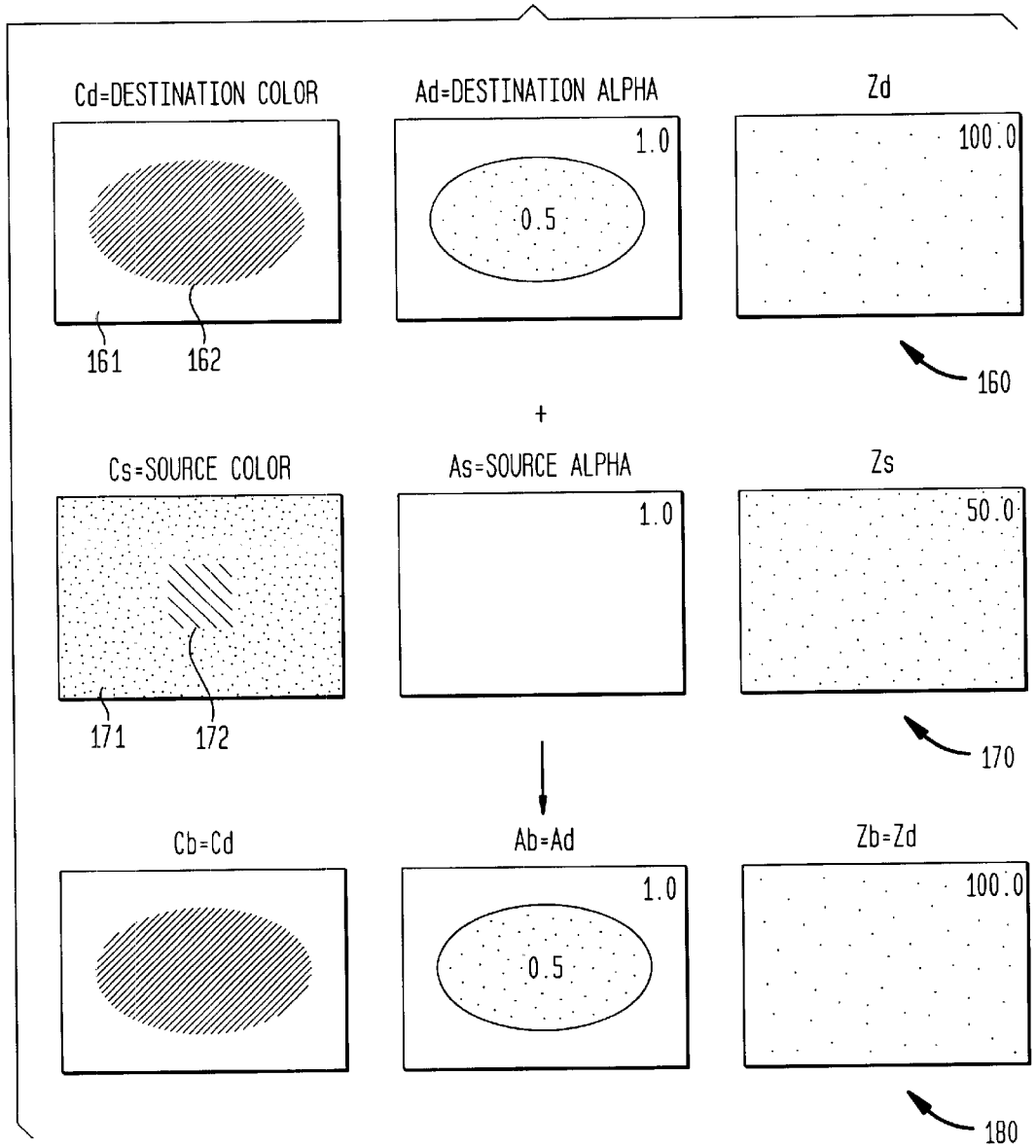
FIG. 7 illustrates an example process of rendering a blended image in which image depth is taken into consideration.
Figure 8:
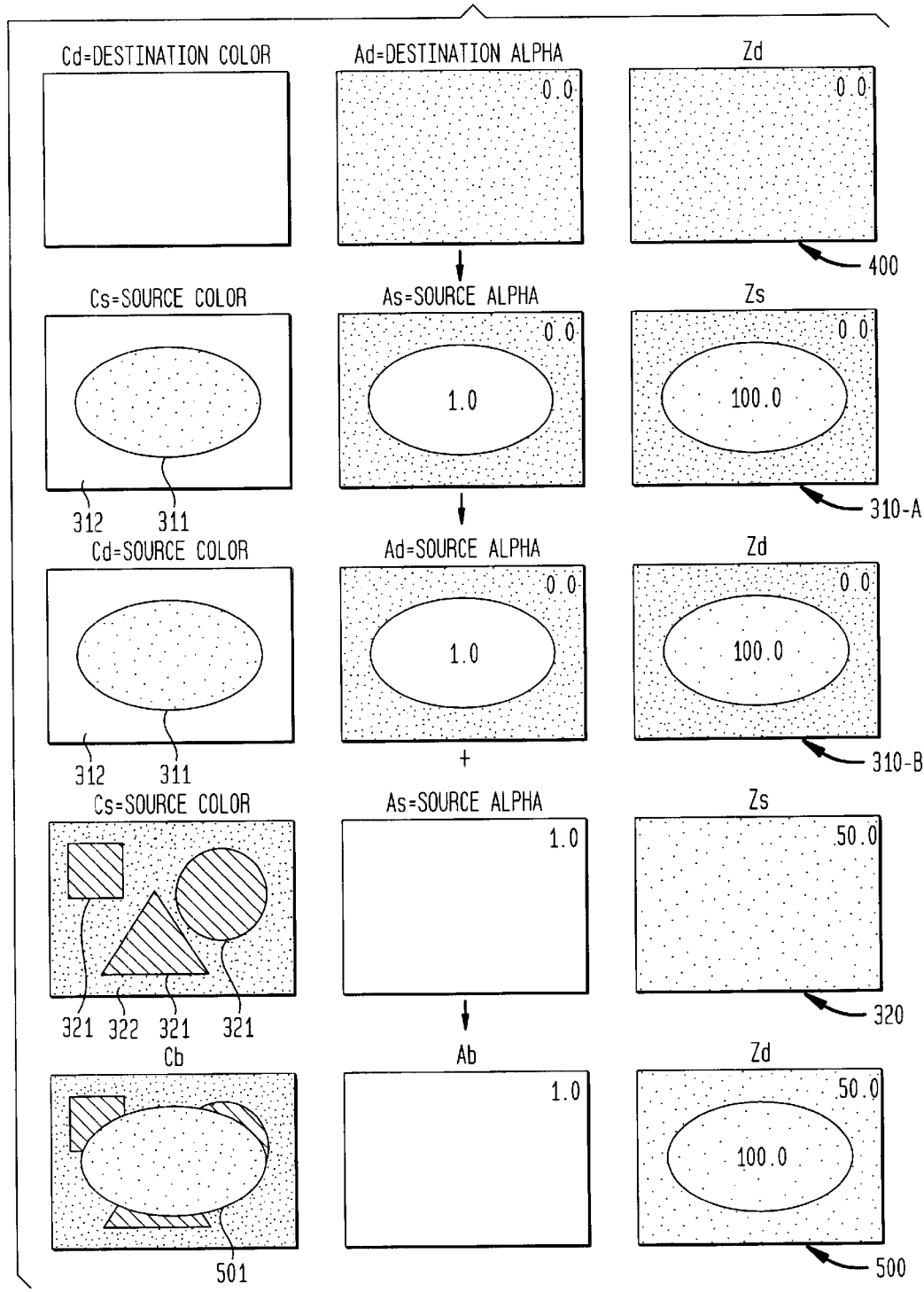
FIG. 8 illustrates an example process in which an opaque region of an image is rendered as a transparent object.
Figure 9:
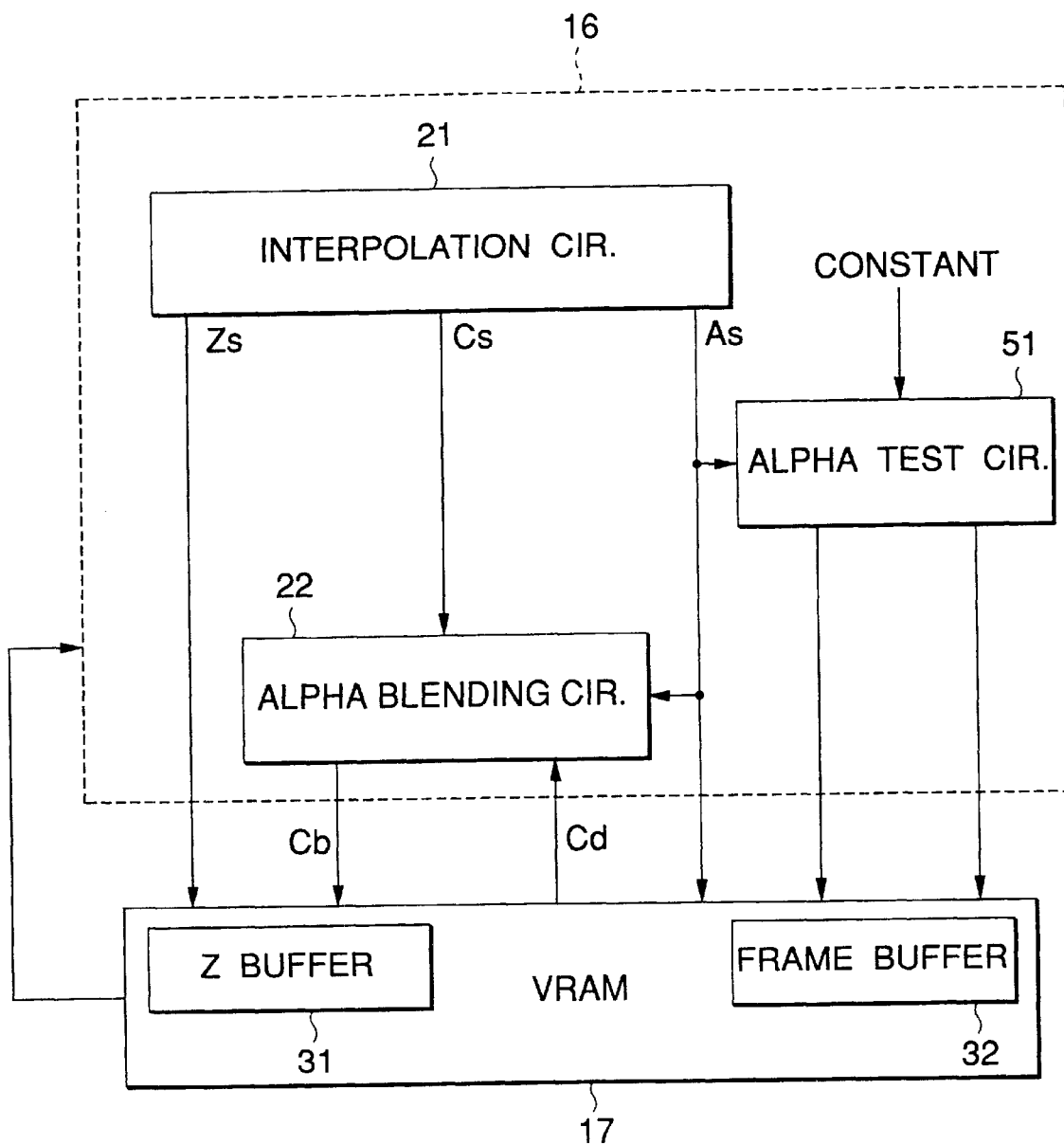
FIG. 9 is a block diagram showing a detailed example configuration of a GPU and a VRAM of an image processing apparatus to which the present invention is applied.

The configuration of an image processing apparatus to which the invention is applied is similar to that of the image processing apparatus of FIG. 1. Therefore, descriptions therefor will be omitted where appropriate. FIG. 9 shows a detailed example configuration of the GPU 16 and the VRAM 17 of the image processing apparatus according to the invention. The components in FIG. 9 that have the corresponding components in FIG. 4 are given the same reference numerals as in FIG. 4 and descriptions therefor will be omitted where appropriate. In this example, a rendering mode is set in advance by the CPU 11 (see FIG. 1) in accordance with a selection input from a user. In this embodiment, two kinds of rendering modes are prepared that are a KEEP mode (first rendering mode) in which neither pixel data nor alpha data is rendered in the VRAM 17 and an RGB-ONLY mode (second rendering mode) in which only pixel data is rendered and alpha data is not rendered.

In the case of a rendering process in which depth data values of images are taken into consideration, three kinds of rendering modes are prepared that are a KEEP mode (first rendering mode) in which none of pixel data, alpha data, and depth data are rendered, an FB-ONLY mode (second rendering mode) in which pixel data and alpha data are rendered but depth data is not rendered, and a ZB-ONLY mode (third rendering mode) in which only depth data is rendered and pixel data and alpha data are not rendered.

An alpha test circuit 51 judges whether the value of alpha data As that is supplied from the interpolation circuit 21 satisfies a predetermined condition including a predetermined constant C. An image rendering process is executed in accordance with a pre-selected rendering mode.

Figure 10:
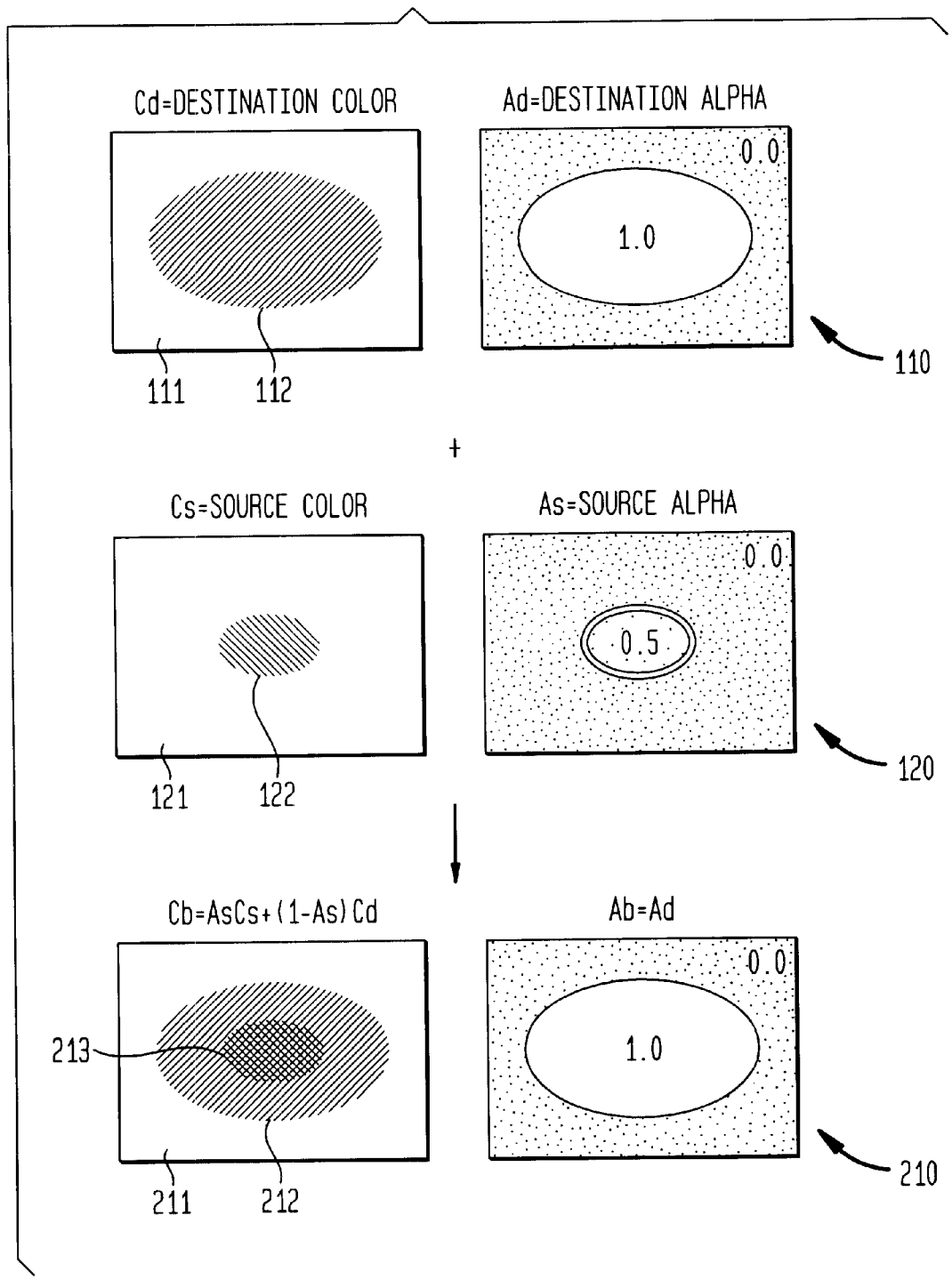
FIG. 10 illustrates an example process of rendering a blended image by superimposing two images on each other.
Figure 11:
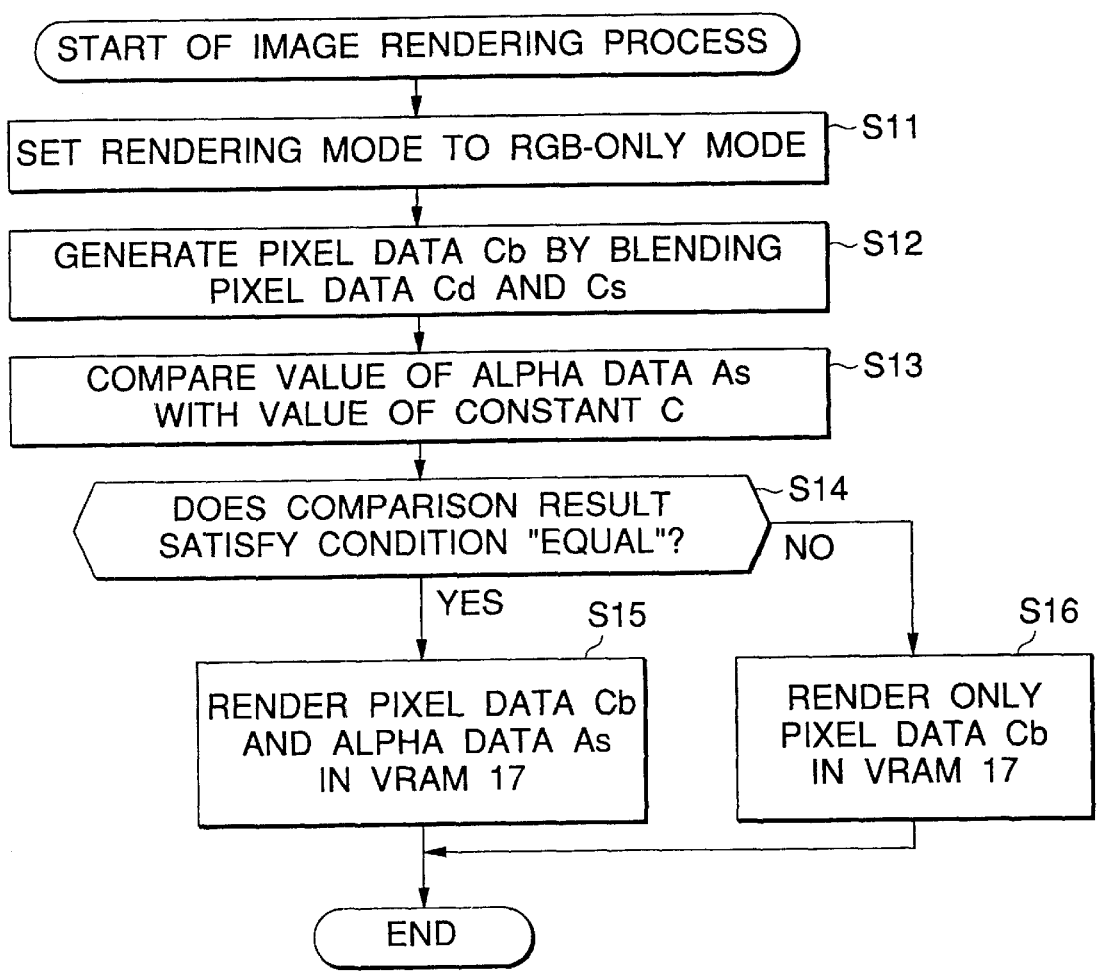
FIG. 11 is a flowchart showing the process of FIG. 10.

FIG. 10 illustrates an example process of rending a blended image by superimposing two images on each other. In this example, a region 112 of an image 110 that is stored in the VRAM 17 in advance is opaque and corresponding alpha data Ad has a value 1.0. A region 122 of an image 120 is translucent and its alpha data As has a value 0.5. A region 111 of the image 110 and a region 121 of the image 120 are transparent and corresponding alpha data Ad and As have a value 0.0. The constant C of the alpha test circuit 51 has a value 1.0 and the condition is "EQUAL." In this case, a process of a flowchart shown in FIG. 11 is executed.

First, at step S11, in this case, the CPU 11 sets the RGB-ONLY mode as a rendering mode to be employed when the condition is not satisfied in the alpha test circuit 51 in accordance with a mode selection instruction. Then, at step S12, the alpha blending circuit 22 generates pixel data Cb by blending pixel data Cd of the image 110 and pixel data Cs of the image 120 by using the alpha data As of the image 120.

At step S13, the alpha test circuit 51 compares the value of the alpha data As of the image 120 with the constant C. Then, at step S14, the alpha test circuit 51 judges whether a comparison result of step S13 satisfies the condition EQUAL. If it is judged at step S14 that the comparison result satisfies the condition, the process goes to step S15, where the alpha test circuit 51 gives an instruction WE-RGB to render the pixel data Cb and an instruction WE-A to render the alpha data As to the VRAM 17, to thereby allow the pixel data Cb that has been blended by the alpha blending circuit 22 and the alpha data As to be rendered in the VRAM 17. However, in this case, step S15 is not executed because the alpha data As of the regions 121 and 122 of the image 120 have respective values 0.0 and 0.5 and hence the condition is not satisfied.

If it is judged at step S14 that the comparison result of step S13 does not satisfy the condition EQUAL, at step S16 the alpha test circuit 51 gives an instruction RGB-ONLY to render only the pixel data Cb and not to render the alpha data As to the VRAM 17 in accordance with the RGB-ONLY mode that was selected and set at step S11, whereby the blended pixel data Cb is rendered in the VRAM 17. As a result, alpha data Ab corresponding to a region 212 and a region 213 (generated by blending opaque pixels and translucent pixels) of a blended image 210 has a value 1.0, which is a proper value.

Figure 12:
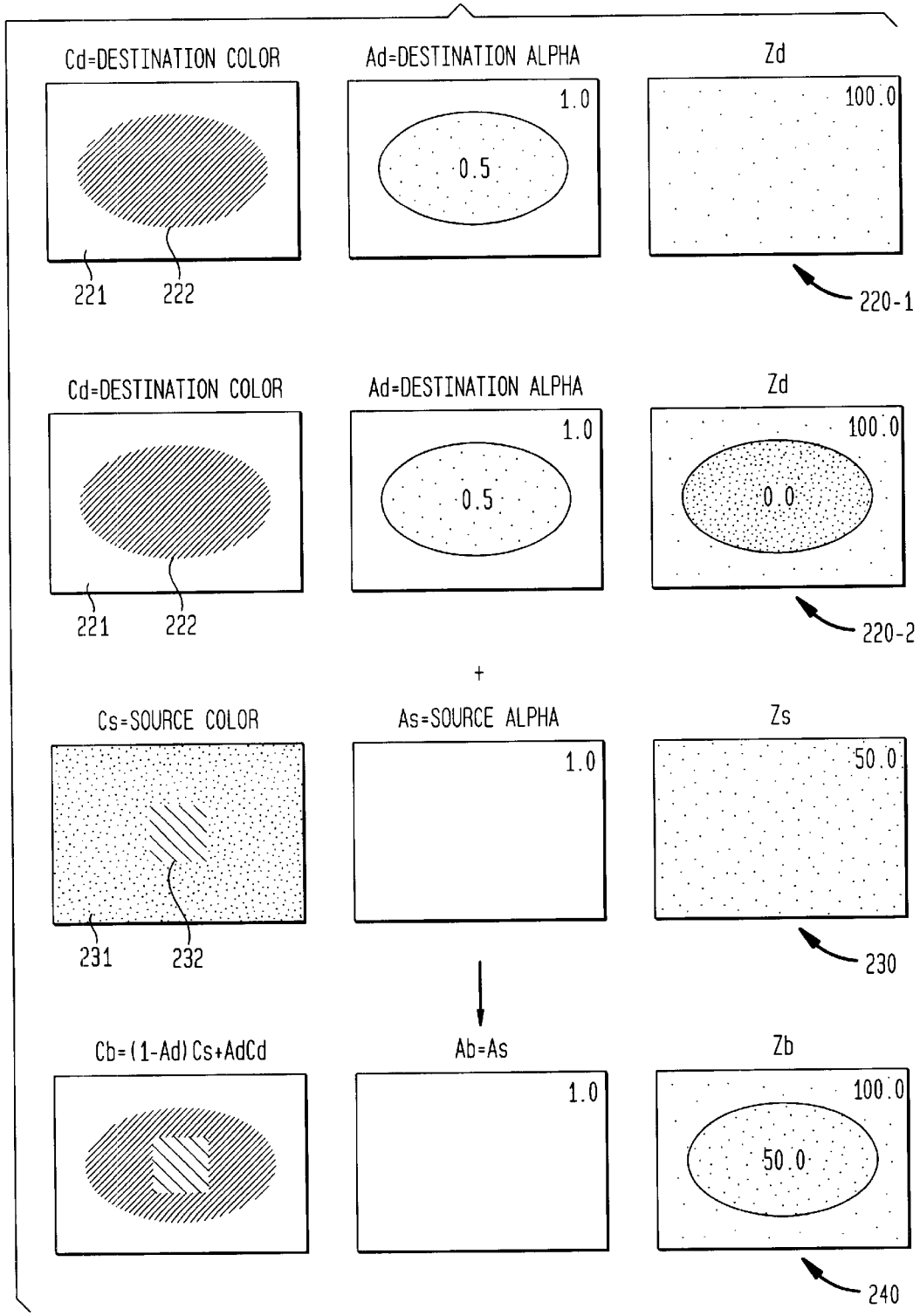
FIG. 12 illustrates an example process of rendering a blended image in which image depth is taken into consideration.
Figure 13:
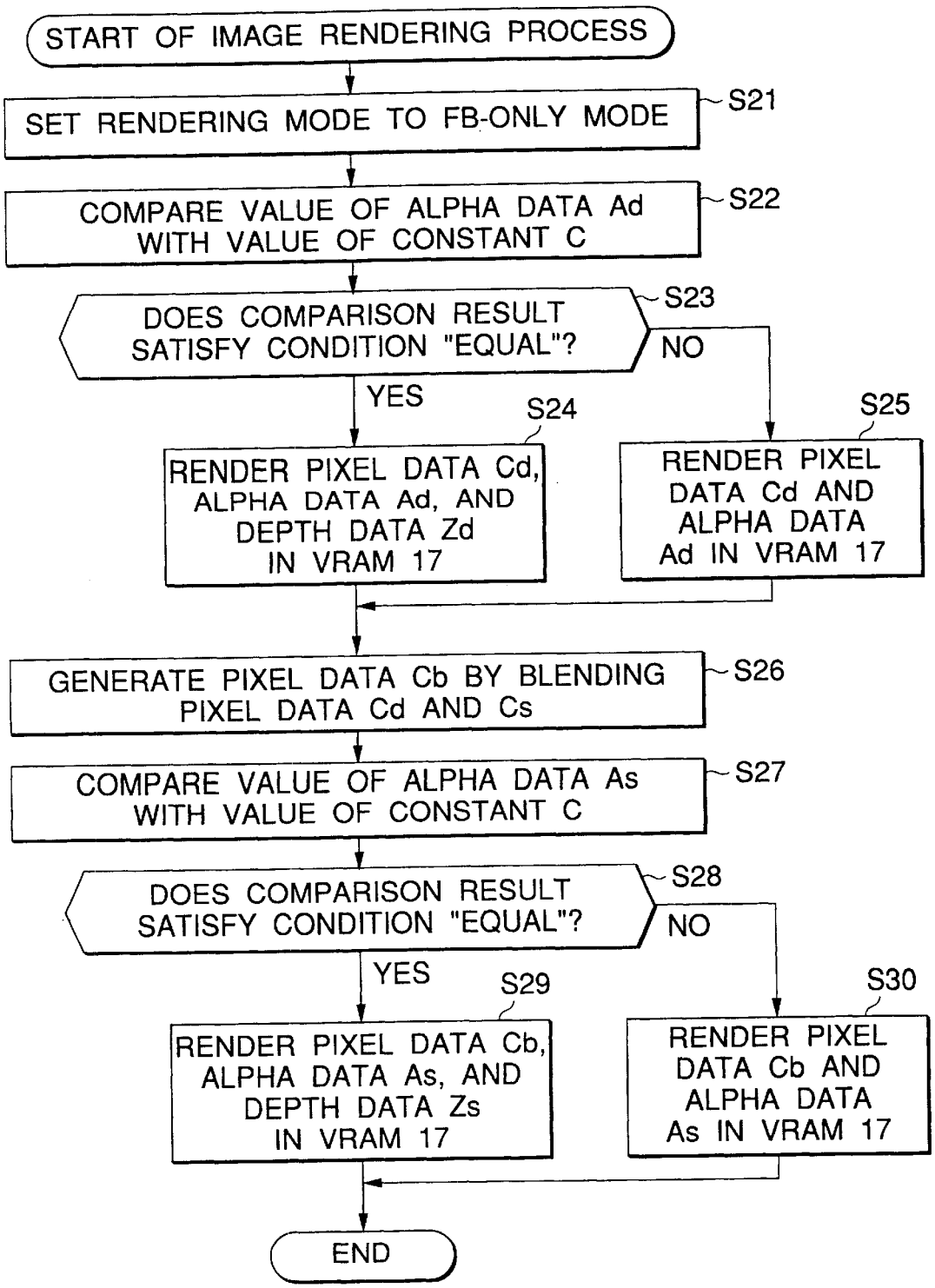
FIG. 13 is a flowchart showing the process of FIG. 12.

Next, with reference to FIG. 12, a description will be made of an example rendering process in which depth data values are taken into consideration. In this example, the value of the constant C is set at 1.0, the condition is set to EQUAL, and the rendering mode to be employed when the condition is not satisfied is set to FB-ONLY. It is assumed that the Z buffer 31 has an initial value 0.0. Alpha data Ad of regions 221 and 222 of an image 220-1 has a value 1.0 (opaque) and a value 0.5 (translucent), respectively. Alpha data As of regions 231 and 232 of an image 230 has a value 1.0 (opaque). Depth data Zd of the images 220-1 and depth data Zs of the image 230 have respective values 100.0 and 50.0, which means that the image 220-1 is closer to the viewer's side than the image 230. In this case, a rendering process shown in a flowchart of FIG. 13 is executed.

First, at step S21, in this case, the CPU 11 sets the FB-ONLY mode as a rendering mode to be employed when the condition is not satisfied in accordance with a user's selection. Then, at step S22, the alpha test circuit 51 compares the value of the alpha data Ad of the image 220-1 with the value of the constant C. Then, at step S23, the alpha test circuit 51 judges whether a comparison result satisfies the condition EQUAL. In this case, since a result of the comparison between the value 1.0 of the alpha data Ad of the region 221 and the value 1.0 of the constant C satisfies the condition, the process goes to step S24. On the other hand, since a result of the comparison between the value 0.5 of the alpha data Ad of the region 222 and the value 1.0 of the constant C does not satisfy the condition, the process goes to step S25.

At step S24, the alpha test circuit 51 gives the VRAM 17 an instruction WE-FB to render pixel data Cd and the alpha data Ad of the region 221 and an instruction WE-ZB to render the depth data Zd of the region 221, to thereby allow the pixel data Cd, the alpha data Ad, and the depth data Zd of the region 221 to be rendered in the VRAM 17. At step S25, in accordance with the FB-ONLY mode that was set at step S21, the alpha test circuit 51 gives the VRAM 17 an instruction WE-FB to render pixel data Cd and the alpha data Ad of the region 222, to thereby allow only the pixel data Cd and the alpha data Ad to be rendered in the VRAM 17. As a result, an image 220-2 is stored in the VRAM 17.

Then, at step S26, the alpha blending circuit 22 generates pixel data Cb by blending the pixel data Cd of the image 220-2 and pixel data Cs of the image 230 by using the alpha data As of the image 230.

At step S27, the alpha test circuit 51 compares the value of the alpha data As of the image 230 with the value of the constant C. At step S28, the alpha test circuit 51 judges whether a comparison result of step S27 satisfies the condition EQUAL. In this case, the condition EQUAL is satisfied because the alpha data As corresponding to the regions 231 and 232 of the image 230 have a value 1.0 which is equal to the value of the constant C. Therefore, the process goes to step S29, where the alpha test circuit 51 gives the VRAM 17 an instruction WE-FB to render the pixel data Cb and the alpha data As and an instruction WE-ZB to render the depth data Zs, to thereby allow the pixel data Cb, the alpha data As, and the depth data Zs to be rendered in the VRAM 17. However, since the value 100.0 of the depth data Zd corresponding to the region 221 of the image 220-2 that is stored in the Z buffer 31 is larger than the value 50.0 of the depth data Zd of the image 230, the depth data Zd is not rendered in the area of the VRAM 17 where the depth data Zd of the region 221 is stored.

If it is judged at step S28 that the comparison result does not satisfy the condition, at step S30 the alpha test circuit 51 gives an instruction RGB-ONLY to render only the pixel data Cb and not to render the alpha data As to the VRAM 17 in accordance with the FB-ONLY mode that was set at step S21, to thereby allow the blended pixel data Cb to be rendered in the VRAM 17. However, this step is not executed in this case.

As a result, a blended image 240 is rendered in such a manner that the image 230 is seen through the translucent region 222 of the image 220-2. In this manner, an image including a translucent portion can be rendered properly irrespective of the order of rendering.

Figure 14:
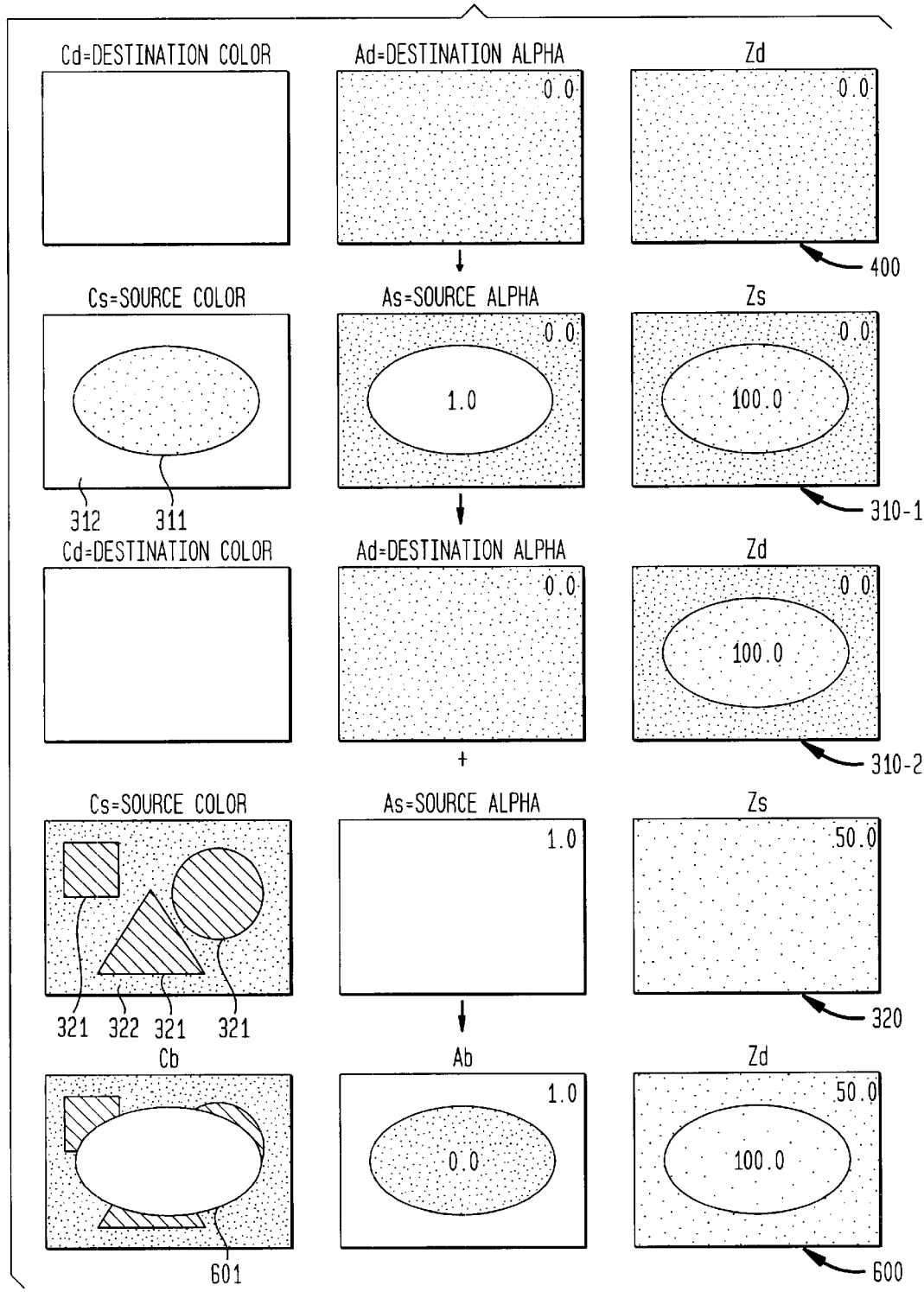
FIG. 14 illustrates an example process in which an opaque region of an image is rendered as a transparent object.

Next, with reference to FIG. 14, a description will be made of an example process in which an opaque polygonal region of an image is rendered as a transparent object. In this example, it is assumed that an image 400 is stored in the VRAM 17 in advance. Both of alpha data Ad and depth data Zd of the image 400 have a value 0.0. Depth data Zs corresponding to pixel data Cd of regions 311 and 312 of an image 310-1 has respective values 100.0 and 0.0, and alpha data As of the regions 311 and 312 has respective values 1.0 (opaque) and 0.0 (transparent). An assumption is made that it is desired that the region 311 be used as a transparent object though it is an opaque object. Alpha data As and depth data Zs of all regions of an image 320 have values 1.0 and 50.0, respectively.

Figure 15:
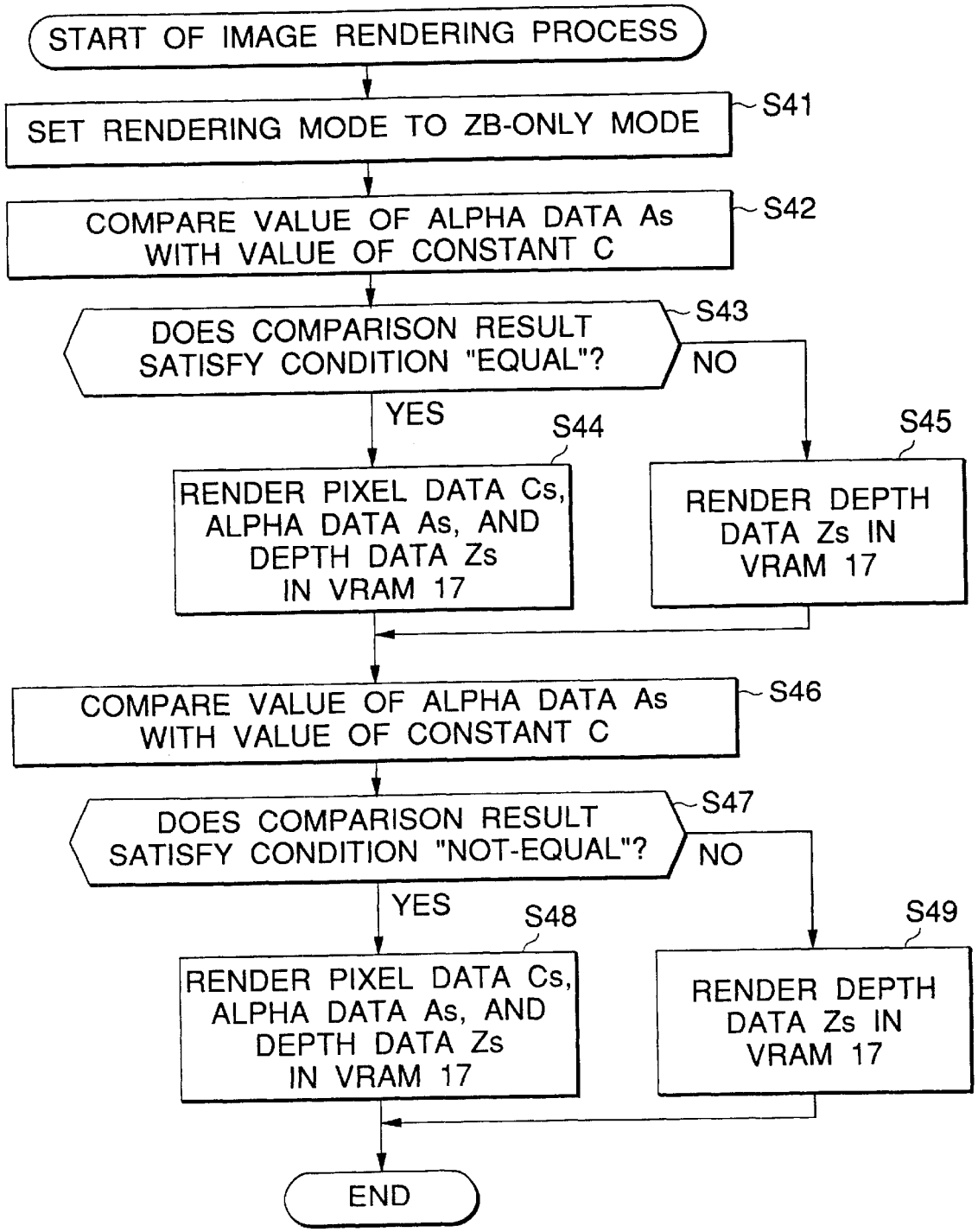
FIG. 15 is a flowchart showing the process of FIG. 14.

It is assumed that a rendering process is executed in such a manner that the constant C is set at 0.0 and the condition is set to EQUAL. The rendering process will be described below with reference to a flowchart of FIG. 15.

First, at step S41, the CPU 11 sets the ZB-ONLY mode as a rendering mode to be employed when the alpha test condition is not satisfied. Then, at step S42, the alpha test circuit 51 compares the value of the alpha data As of the image 310-1 with the value of the constant C. At step S43, the alpha test circuit 51 judges whether a comparison result satisfies the condition EQUAL. In this case, since a result of the comparison between the value 0.0 of the alpha data As of the region 312 and the value 0.0 of the constant C satisfies the condition EQUAL (they are equal to each other), the process goes to step S44. On the other hand, since a result of the comparison between the alpha data As of the region 311 and the value 0.0 of the constant C does not satisfy the condition EQUAL (they are not equal to each other), the process goes to step S45.

At step S44, the alpha test circuit 51 gives instructions WE-FB and WE-ZB to the VRAM 17, to thereby allow the pixel data Cs, the alpha data As, and the depth data Zs corresponding to the region 312 to be rendered in the VRAM 17. At step S45, the alpha test circuit 51 gives an instruction WE-ZB to the VRAM 17 in accordance with the ZB-ONLY mode that was set at step S41, to thereby allow only the depth data Zs corresponding to the region 312 to be rendered in the VRAM 17.

As a result, an image 310-2 is rendered in the VRAM 17. Now, the image 320 is to be blended with the image 310-2. At this stage, the CPU 11 sets a new condition NOT-EQUAL in accordance with a user's selection.

At step S46, the alpha test circuit 51 compares the value of the alpha data As with the value of the constant C. Then, at step S47, the alpha test circuit 51 judges whether a comparison result satisfies the condition NOT-EQUAL. In this case, the alpha data As corresponding to the regions 321 and 322 has a value 1.0 and hence is not equal to the value 0.0 of the constant C. Since the condition NOT-EQUAL is satisfied, the process goes to step S48. At step S48, the alpha test circuit 51 gives instructions WE-FB and WE-ZB to the VRAM 17, to thereby allow the pixel data Cs, the alpha data As, and the depth data Zs of all regions of the image 320 to be rendered in the VRAM 17.

Since the value 100.0 of the depth data Zd corresponding to the region 311 of the image 310-2 that is stored in the Z buffer 31 is larger than the value 50.0 of the depth data Zs of the image 320, rendering of the pixel data Cs and the depth data Zs of the image 320 is prohibited in the region 311. Step S49 is not considered here however, since the condition NOT-EQUAL was satisfied.

As a result, alpha data Ab corresponding to a region 601 of a rendered image 600 has a value 0.0 indicating that the region 601 is transparent; that is, the region 601 is expressed as a transparent object.

By executing a process as described above, even an opaque image, for instance, can be rendered as a transparent image. That is, it becomes possible to use the same image data as either opaque image data or transparent image data. The memory capacity can be saved accordingly.

Examples of transmission media for transmitting a program for a process of any of the above kinds are recording media such as a magnetic disk, a CD-ROM, and a solid-state memory, and communication media such as a network and a satellite.

As described above, in the above image processing apparatus and method and the transmission medium according to respective aspects of the invention, pixel data and additional information are rendered if it is judged that the additional information that is added to pixel data satisfies a predetermined condition, and a rendering process is executed in accordance with a selected rendering mode among a plurality of rendering modes if it is judged that the additional information does not satisfy the condition. Therefore, an image including a translucent polygon can be rendered correctly.

What is claimed is:

1. An apparatus for processing image information, comprising:

means for selecting an image rendering mode in accordance with a selection input from a user;

means for producing pixel data and other data from the image information;

means for judging whether at least a portion of the other data satisfies a predetermined condition after the image rendering mode is selected;

means for permitting the pixel data and the other data to be written into a frame buffer memory if the judging means determines that the portion of the other data satisfies the predetermined condition; and means for processing the pixel data and the other data in accordance with the selected image rendering mode and writing at least said pixel data into said frame buffer memory if the judging means determines that the portion of the other generated data does not satisfy the predetermined condition.

2. The image processing apparatus according to claim 1, wherein the selected image rendering mode includes at least one of a first rendering mode in which neither the pixel data nor the other data is rendered; and a second rendering mode in which only the pixel data is rendered.

3. The image processing apparatus according to claim 1, wherein the other data comprises alpha data and depth data, and the selected image rendering mode includes at least one of a first rendering mode in which neither of the pixel data, the alpha data, nor the depth data are rendered; a second rendering mode in which only the pixel data and the alpha data are rendered; and a third rendering mode in which only the depth data is rendered.

4. The image processing apparatus according to claim 1, further comprising means for generating pixel data of a third image by blending pixel data of a region that defines a first image and pixel data of a region that defines a second image in accordance with the other data.

5. An image processing apparatus according to claim 4, further comprising:

means for performing a second judging step to determine whether the portion of the other data satisfies the predetermined condition;

means for rendering the pixel data and the other data if the second judging step judges that the portion of the other data satisfies the predetermined condition; and means for executing a rendering process in accordance with the selected image rendering mode if the second judging step judges that the portion of the other data does not satisfy the predetermined condition.

6. An image processing apparatus according to claim 1, further comprising:

means for performing a second judging step to determine whether the portion of the other data satisfies the predetermined condition;

means for rendering the pixel data and the other data if the second judging step judges that the portion of the other data does not satisfy the predetermined condition; and means for executing a rendering process in accordance with the selected image rendering mode if the second judging step judges that the portion of the other data satisfies the predetermined condition.

7. A method for processing image information, comprising the steps of:

selecting an image rendering mode in accordance with a selection input from a user;

producing pixel data and other data from the image information;

judging whether at least a portion of the other data satisfies a predetermined condition after the image rendering mode is selected;

permitting the pixel data and the other data to be written into a frame buffer memory if the portion of the other data satisfies the predetermined condition in the judging step; and processing the pixel data and the other data in accordance with the selected image rendering mode and writing at least said pixel data into said frame buffer memory if the portion of the other data does not satisfy the predetermined condition in the judging step.

8. An image processing method according to claim 7, further comprising generating pixel data of a third image by blending pixel data of a region that defines a first image and pixel data of a region that defines a second image in accordance with the other data.

9. An image processing method according to claim 8, further comprising:

performing a second judging step to determine whether the portion of the other data satisfies the predetermined condition;

rendering the pixel data and the other data if the second judging step judges that the portion of the other data satisfies the predetermined condition; and executing a rendering process in accordance with the selected image rendering mode if the second judging step judges that the portion of the other data does not satisfy the condition.

10. An image processing method according to claim 7, further comprising:

performing a second judging step to determine whether the portion of the other data satisfies the predetermined condition;

rendering the pixel data and the other data if the second judging step judges that the portion of the other data does not satisfy the predetermined condition; and executing a rendering process in accordance with the selected image rendering mode if the second judging step judges that the portion of the other data satisfies the predetermined condition.

11. A transmission medium for transmission of a program for processing image information, the program comprising the steps of:

selecting an image rendering mode in accordance with a selection input from a user;

producing pixel data and other data from the image information;

judging whether at least a portion of the other data satisfies a predetermined condition after the image rendering mode is selected;

permitting the pixel data and other data to be written into a frame buffer memory if the portion of the other data satisfies the predetermined condition in the judging step; and processing the pixel data and the other data in accordance with the selected rendering mode and writing at least said pixel data into said frame buffer memory if the portion of the other data does not satisfy the predetermined condition in the judging step.

12. A transmission medium for transmission of a program according to claim 11, the program further comprising the step of generating pixel data of a third image by blending pixel data of a region that defines a first image and pixel data of a region that defines a second image in accordance with the other data.

13. A transmission medium for transmission of a program, according to claim 12, the program further comprising the steps of:

performing a second judging step to determine whether the portion of the other data satisfies the predetermined condition;

rendering the pixel data and the other data if the second judging step judges that the portion of the other data satisfies the predetermined condition; and executing a rendering process in accordance with the selected image rendering mode if the second judging step judges that the portion of the other data does not satisfy the predetermined condition.

14. A transmission medium for transmission of a program according to claim 11, the program further comprising the steps of:

performing a second judging step to determine whether the portion of the other data satisfies the predetermined condition;

rendering the pixel data and the other data if the second judging step judges that the portion of the other data does not satisfy the predetermined condition; and executing a rendering process in accordance with the selected image rendering mode if the second judging step judges that the portion of the other data satisfies the predetermined condition.

* * * * *